(12) United States Patent
Robuck et al.

(10) Patent No.: US 11,719,326 B2
(45) Date of Patent: Aug. 8, 2023

(54) DEMISTER FOR A GEARING SYSTEM AND METHOD

(71) Applicant: THE BOEING COMPANY, Chicago, IL (US)

(72) Inventors: Mark Joseph Robuck, Chadds Ford, PA (US); Patrick M. Ridgley, Media, PA (US); Craig W. Eiser, Cochranville, PA (US)

(73) Assignee: THE BOEING COMPANY

( * ) Notice: Subject to any disclaimer, the term of this patent is extended or adjusted under 35 U.S.C. 154(b) by 13 days.

(21) Appl. No.: 17/502,241

(22) Filed: Oct. 15, 2021

(65) Prior Publication Data

US 2022/0333678 A1 Oct. 20, 2022

Related U.S. Application Data

(60) Provisional application No. 63/176,391, filed on Apr. 19, 2021.

(51) Int. Cl.
*F16H 57/04* (2010.01)

(52) U.S. Cl.
CPC ....... *F16H 57/0404* (2013.01); *F16H 57/042* (2013.01)

(58) Field of Classification Search
CPC ............... F16H 57/042; F16H 57/0404; F16H 57/0427; F16H 57/0428; F16N 39/002; F01M 2013/0422; F01M 2013/0427; F01M 2013/0438
See application file for complete search history.

(56) References Cited

U.S. PATENT DOCUMENTS

| 5,114,446 | A  | * | 5/1992 | Giersdorf | F01D 25/18 |
|           |    |   |        |           | 55/438 |
| 6,033,450 | A  | * | 3/2000 | Krul | B01D 45/14 |
|           |    |   |        |           | 55/438 |
| 11,125,314 | B2 | * | 9/2021 | Robuck | F01M 13/04 |

(Continued)

FOREIGN PATENT DOCUMENTS

| CN | 108757893 A | * | 11/2018 | ............ F16H 55/17 |
| DE | 102004045630 A1 | * | 4/2006 | ............ B01D 45/14 |
| WO | WO-2006119737 A1 | * | 11/2006 | ............ F01L 1/047 |

OTHER PUBLICATIONS

USPTO Machine Translation (retrieved from FIT database) of CN 108757893 A, Yang et al., Nov. 6, 2018. (Year: 2023).*

(Continued)

*Primary Examiner* — Daniel D Yabut
(74) *Attorney, Agent, or Firm* — The Small Patent Law Group LLC; Joseph M. Butscher

(57) ABSTRACT

A demister for a gearing system includes a main body having an inner annular rim coupled to an outer annular rim through a first wall and a second wall opposite from the first wall. The main body is configured to be rotated about a central longitudinal axis to create centrifugal forces that separate oil mist particles from air. First fluid passages extend radially between and through the inner annular rim and the outer annular rim. The first fluid passages include a fluid inlet opening in the outer annular rim and a fluid outlet opening in the inner annular rim. The fluid inlet opening is configured to accept incoming air. The fluid outlet opening is configured to discharge filtered air.

25 Claims, 10 Drawing Sheets

(56) References Cited

U.S. PATENT DOCUMENTS

| | | | | |
|---|---|---|---|---|
| 2002/0083933 | A1* | 7/2002 | Schmid | F01M 13/04 |
| | | | | 123/572 |
| 2007/0294986 | A1* | 12/2007 | Beetz | F01L 1/047 |
| | | | | 55/385.3 |
| 2009/0133961 | A1* | 5/2009 | Corattiyil | B01D 45/14 |
| | | | | 55/452 |
| 2014/0007736 | A1* | 1/2014 | Mueller | F01L 1/047 |
| | | | | 74/567 |
| 2016/0325214 | A1* | 11/2016 | Davis | F16J 15/324 |

OTHER PUBLICATIONS

Johan Steimes, et al, "Performance Study of an Air-Oil Pump and Separator Solution" Proceedings of ASME Turbo Expo 2012, Jun. 11-15, 2012, Copenhagen, Denmark.

Lyu, Yaguo, et al, "The Improvement of Air/Oil Separator Performance in the Aero-Engine Lubrication System", Proceedings of ASME Turbo Expo 2017: Turbomachinery Technical Conference and Exposition GT2017, Jun. 26-30, 2017, Charlotte, NC, USA.

Ronald D. Belden & William J. Reddy (1994) Lubrication Oil Reservoir Mist Elimination, Air & Waste, 44:4, 441-451.

\* cited by examiner

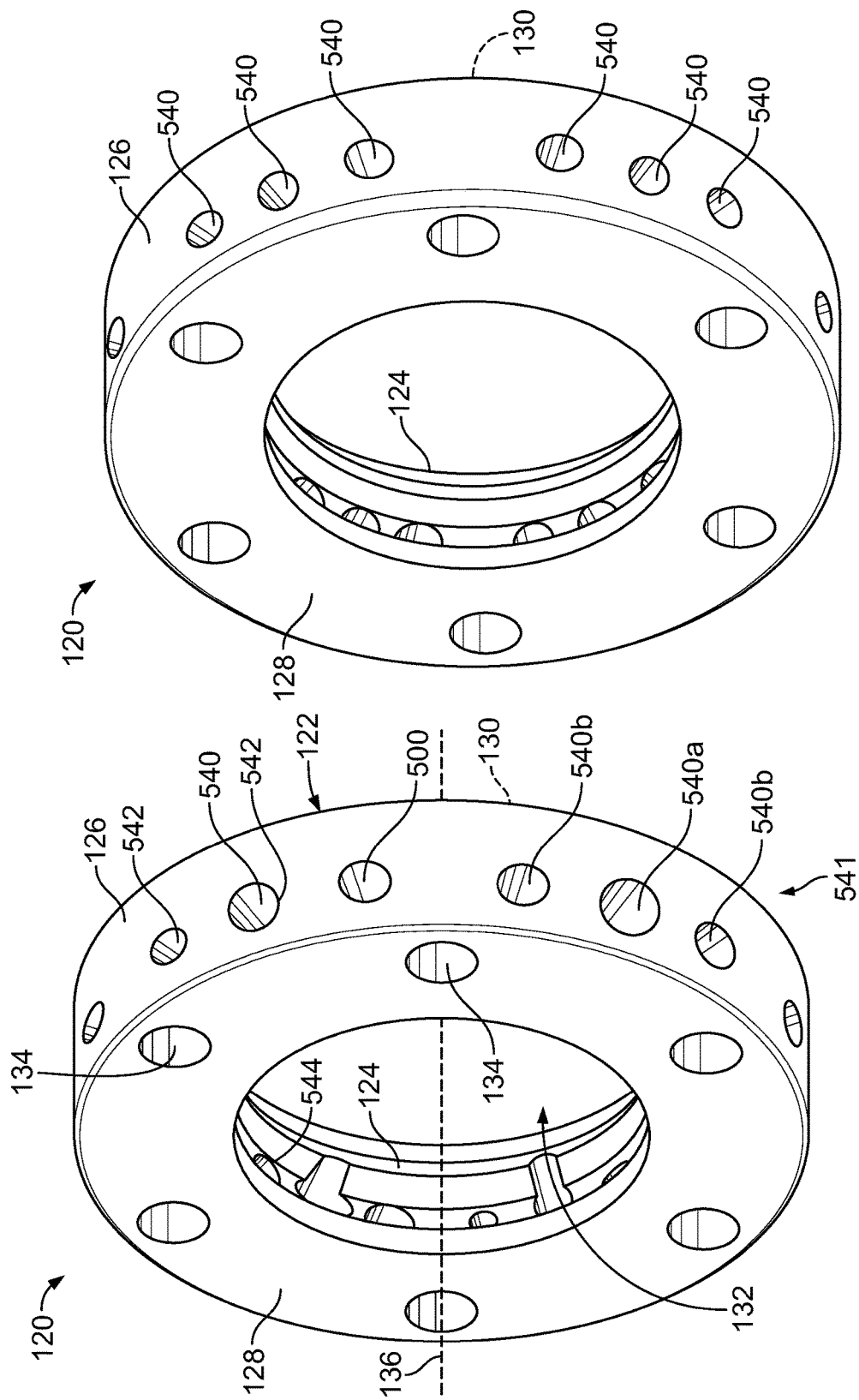

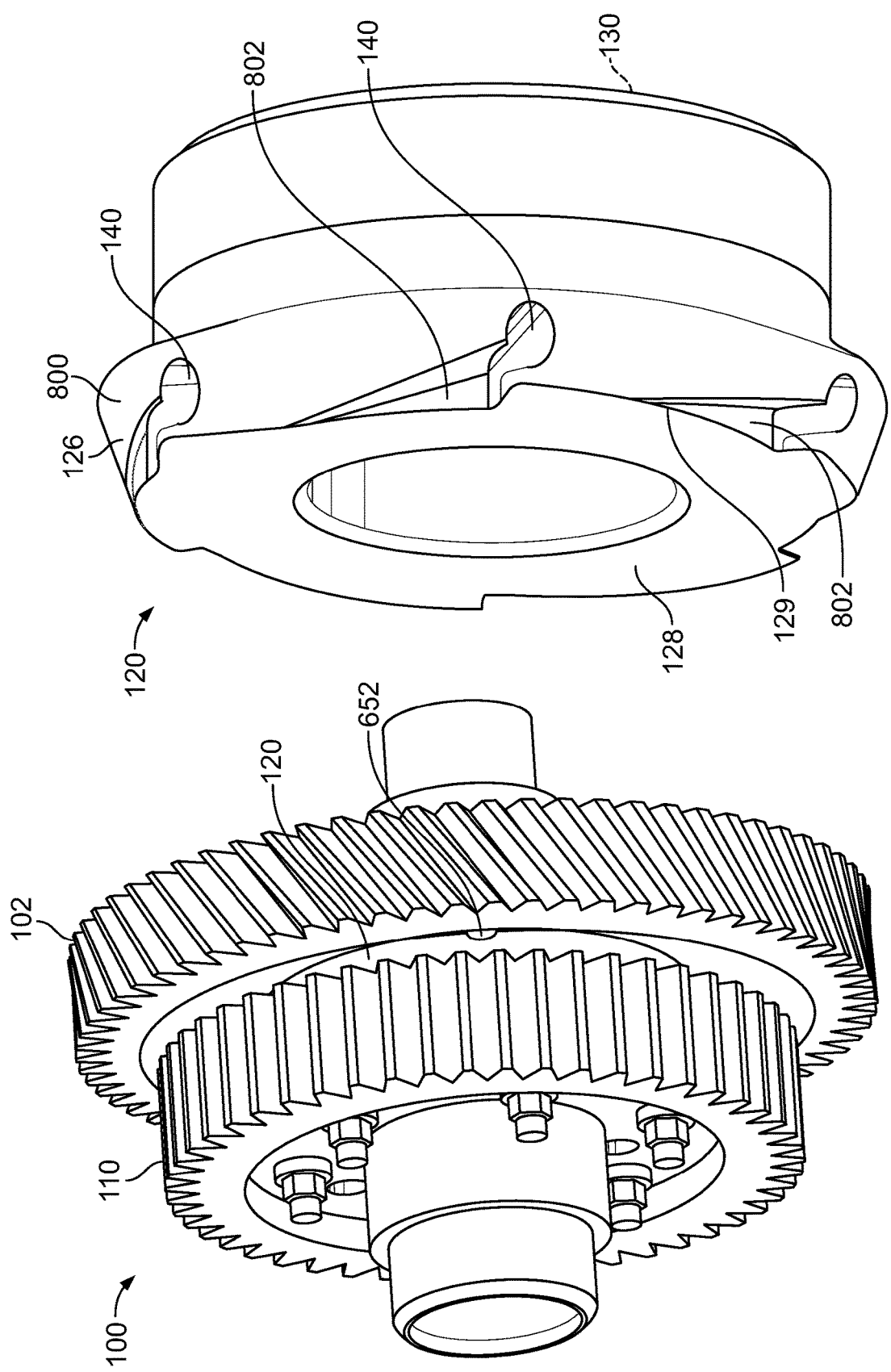

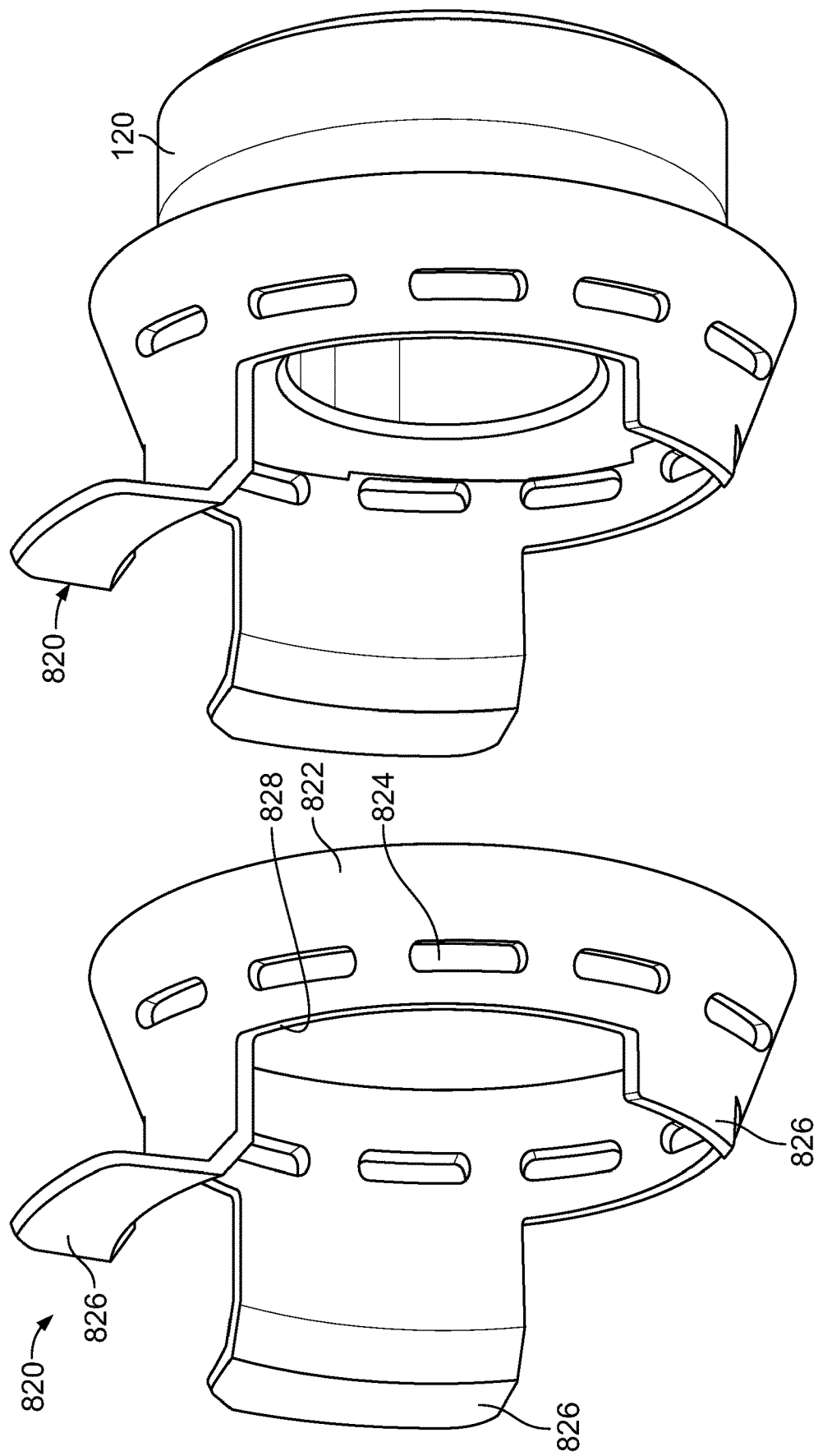

DEMISTER FOR A GEARING SYSTEM AND METHOD

RELATED APPLICATIONS

This application relates to and claims priority benefits from U.S. Provisional Patent Application No. 63/176,391, entitled "Demister for a Gearing System and Method," filed Apr. 19, 2021, which is hereby incorporated by reference in its entirety.

FIELD OF EMBODIMENTS OF THE DISCLOSURE

Embodiments of the present disclosure generally relate to oil-separating devices for gearing systems and methods, such as may be used with auxiliary power units.

BACKGROUND OF THE DISCLOSURE

Various vehicles, such as commercial aircraft, include one or more auxiliary power units (APUs). An APU generally provides energy for functions other than propulsion. A typical APU includes a gearbox that transfers power from a main shaft of an engine to a generator for electrical power. Within the gearbox, power may also be transferred to engine accessories, such as a fuel control unit, a lubrication module, and a cooling fan.

During operation, a stream of air from an engine secondary air system (for example, cooling and seal air) passes through the gearbox as the air is routed to an exhaust. The air typically carries oil mist particles from the gearbox. As such, an air-oil separating device is used to separate the oil mist particles from the air. However, there is typically a portion of remaining oil that is transported out of the gearbox, which leads to a steady rate of oil consumption from a lubricating system.

Some systems include oil separating devices such as wire mesh or sintered barrier filter media to entrain the oil mist and return it to the gearbox. However, such systems may generate increased backpressure.

SUMMARY OF THE DISCLOSURE

A need exists for an air-oil separating device that effectively and efficiently removes oil from air. Further, a need exists for an air-oil separating device that reduces backpressure and oil consumption rate.

With those needs in mind, certain embodiments of the present disclosure provide a demister for a gearing system. The demister includes a main body having an inner annular rim coupled to an outer annular rim through a first wall and a second wall opposite from the first wall. The main body is configured to be rotated about a central longitudinal axis to create centrifugal forces that separate oil mist particles from air. First fluid passages extend radially between and through the inner annular rim and the outer annular rim. The first fluid passages include a fluid inlet opening in the outer annular rim and a fluid outlet opening in the inner annular rim. The fluid inlet opening is configured to accept incoming air. The fluid outlet opening is configured to discharge filtered air. In at least one embodiment, a central opening is defined by the inner annular rim and extends between and through the first wall and the second wall.

In at least one embodiment, the demister further includes second fluid passages extending axially between and through the first wall and the second wall. In at least one example, the first fluid passages do not interfere with the second fluid passages.

In at least one embodiment, the first fluid passages include groups of two or more first fluid passages. For example, each of the groups is disposed between two second fluid passages that extend between and through the first wall and the second wall.

As an example, each of the first fluid passages may be coaxial and aligned with a radial line.

In at least one embodiment, a ridge extends from one of the first wall or the second wall. One or more scallops are formed in the ridge.

In at least one embodiment, the inner annular rim includes one or more radial recesses formed into an interior edge.

As an example, the outer annular rim comprises a conic wall segment that slopes downwardly toward one of the first wall or the second wall. As a further example, the outer annular rim includes fluid slots that connect to the first fluid passages. As a further example, the fluid slots further connect to an outer edge of the first wall or the second wall.

In at least one embodiment, a baffle is configured to be disposed around at least a portion of the main body. The baffle is further configured to be secured to a gearbox. In at least one embodiment, the baffle includes fluid openings.

Certain embodiments of the present disclosure provide a gearing system including a first gear having a central shaft defining a central channel, a second gear, and a demister coupled to the first gear and the second gear, as described herein. The gearing system may also include a barrier filter disposed within the central channel.

BRIEF DESCRIPTION OF THE DRAWINGS

FIG. 10 illustrates a perspective front view of a demister, according to an embodiment of the present disclosure.

FIG. 11 illustrates a perspective front view of a demister, according to an embodiment of the present disclosure.

FIG. 14 illustrates a perspective view of the gearing system having the demister of FIGS. 12 and 13.

FIG. 15 illustrates a perspective view of a demister, according to an embodiment of the present disclosure.

FIG. 16 illustrates a perspective view of a baffle, according to an embodiment of the present disclosure.

FIG. 17 illustrates a perspective view of the baffle coupled to the demister of FIG. 15, according to an embodiment of the present disclosure.

DETAILED DESCRIPTION OF THE DISCLOSURE

Figure 1:
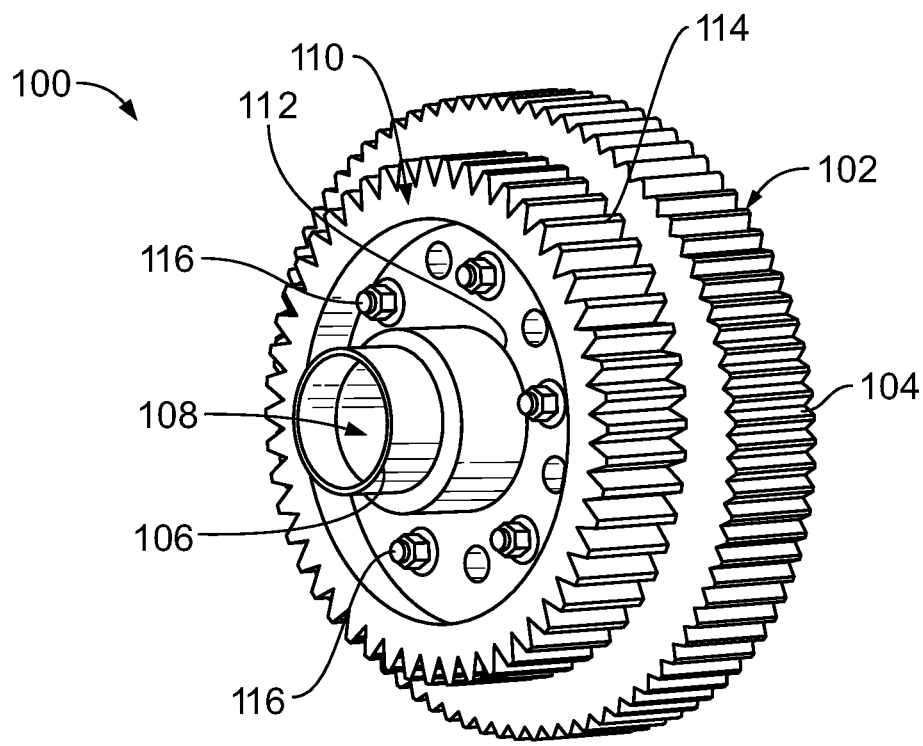
FIG. 1 illustrates a perspective front view of a gearing system, according to an embodiment of the present disclosure.

The foregoing summary, as well as the following detailed description of certain embodiments, will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Certain embodiments of the present disclosure provide a demister (for example, a device for separating air from oil) for gearing systems and methods. In at least one embodiment, the demister includes a main body having radial fluid passages. The demister acts as an air-oil separator through centrifugal effects produced by high-speed rotation. The fluid passages are fluidly coupled to fluid entrance channels, such as formed within an outer annular wall, which create a swirling motion as an air-oil mixture flows into the radial passages.

The demister functions within a gearbox, and provides an air-oil separator that uses a rotational or centrifugal force field to separate denser oil mist particles from air that is discharged from a gearbox ventilation line. In at least one embodiment, the fluid passages are angled such as to be biased toward or away from a direction of rotation. In addition, the demister imparts an additional spin to air entering the radial holes for increased oil-separating effectiveness. The spin is produced by machining the fluid entrance channel at the edge of the radial hole. The fluid entrance channel causes the fluid mixture (of air and oil mist particles) to swirl into the radial hole as it travels through the device and is exhausted. The swirling motion causes additional centrifugal force that accelerates the oil particles to the walls of the radial hole, where the oil particles adhere and coalesce with other oil particles, thereby increasing oil separation. In at least one embodiment, the device does not use barrier filters which may otherwise cause higher pressure drops and potential contamination.

Certain embodiments of the present disclosure provide a demister including a plate having a central opening and configured to be rotated about a central axis to create centrifugal forces. The centrifugal forces are configured to separate oil mist particles from incoming air to create filtered exhaust air and leave separated oil mist particles behind. The plate includes a plurality of radial passages with openings at the outer and inner edges of the plate. The radial passages are configured to accept the incoming air at the outer edge and emit filtered exhaust air from the inner edge. In at least one embodiment, the plurality of radial passages are angled. For example, the plurality of radial passages are angled toward a direction of rotation. In at least one embodiment, the angle of the radial passages is selected to produce variation in a desired pressure ratio between the outer and inner edges of the plate. In at least one other embodiment, the radial passages are not angled. In at least one embodiment, the demister includes a plurality of entrance channels along the outer edge of the disk-shaped plate. Each of the entrance channels leads to an edge of a respective radial passage. The entrance channels are aligned to produce additional centrifugal forces.

Certain embodiments of the present disclosure provide a method including rotating a plate about a central axis to create centrifugal forces. The plate has a central opening and includes a plurality of radial passages with openings at the outer and inner edges of the plate. The method also includes bringing incoming air into contact with the outer edge of the plate. The incoming air includes oil mist particles. The method also includes separating the oil mist particles from the incoming air to create filtered exhaust air by using the centrifugal forces and the radial passage openings located at the outer edge, and emitting the filtered exhaust air from the radial passage openings located at the inner edge. The method may also include using a plurality of entrance channels along the outer edge of the disk-shaped plate to cause increased rotational velocity in the incoming air and improve the effectiveness of said separating.

Certain embodiments of the present disclosure provide a demister having a main body, such as can be shaped as a disk. The main body has one or more radial passages that act as an air-oil separator through the centrifugal effects produced by high-speed rotation, and in conjunction channels create a swirling motion as the air-oil mixture flows into the radial passages. An optional barrier filter (for example, a mesh) can also be used. Inclusion of the barrier filter provides a torturous path through which the oil passes. In effect, air is permitted to pass through while oil is collected in the mesh. The barrier filter may be sized for various pressure drops. In at least one embodiment, one or more baffles may be used to facilitate the creation of a velocity differential between the air-oil mixture within the gearbox and the portion of the mixture that is local to the demister. The velocity differential facilitates entry of the mixture into the demister.

Certain embodiments of the present disclosure provide a rotating main body (such as a disk) with radial holes, which may or may not be biased toward or away from the direction of rotation. The main body rotates at a high rate of speed to remove oil mist particles from the discharging air oil mixture using centrifugal force. In addition, the device imparts an additional spin to the air entering the radial holes for increased oil separation effectiveness. The spin is produced by machining an entrance channel at the edge of the radial hole causing the air-oil mixture to swirl into the radial hole as it travels through the device and is exhausted.

FIG. 1 illustrates a perspective front view of a gearing system 100, according to an embodiment of the present disclosure. The gearing system 100 includes a first gear 102 having a geared circumferential edge 104 and a central shaft 106 defining a central channel 108. A second gear 110 is mounted to the first gear 102. The second gear 110 has a central opening 112 into which the central shaft 106 of the first gear 102 is positioned. The second gear 110 also includes a geared circumferential edge 114 and is secured to the first gear through a plurality of fasteners 116, such as bolts and nuts.

Figure 2:
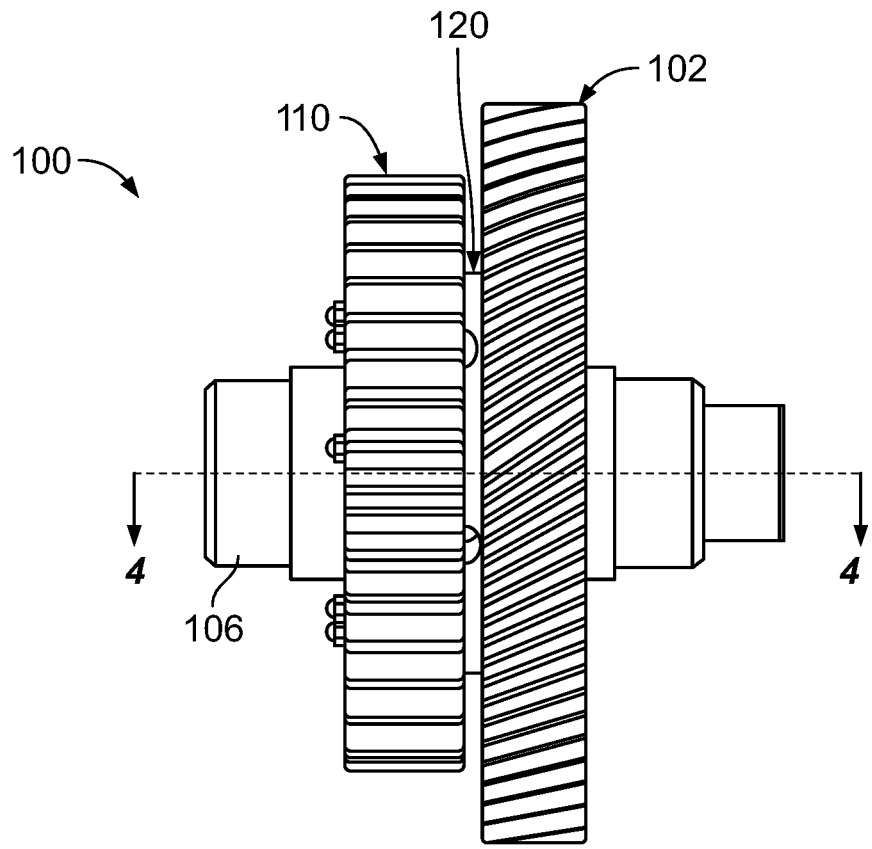
FIG. 2 illustrates a top view of the gearing system.
Figure 3:
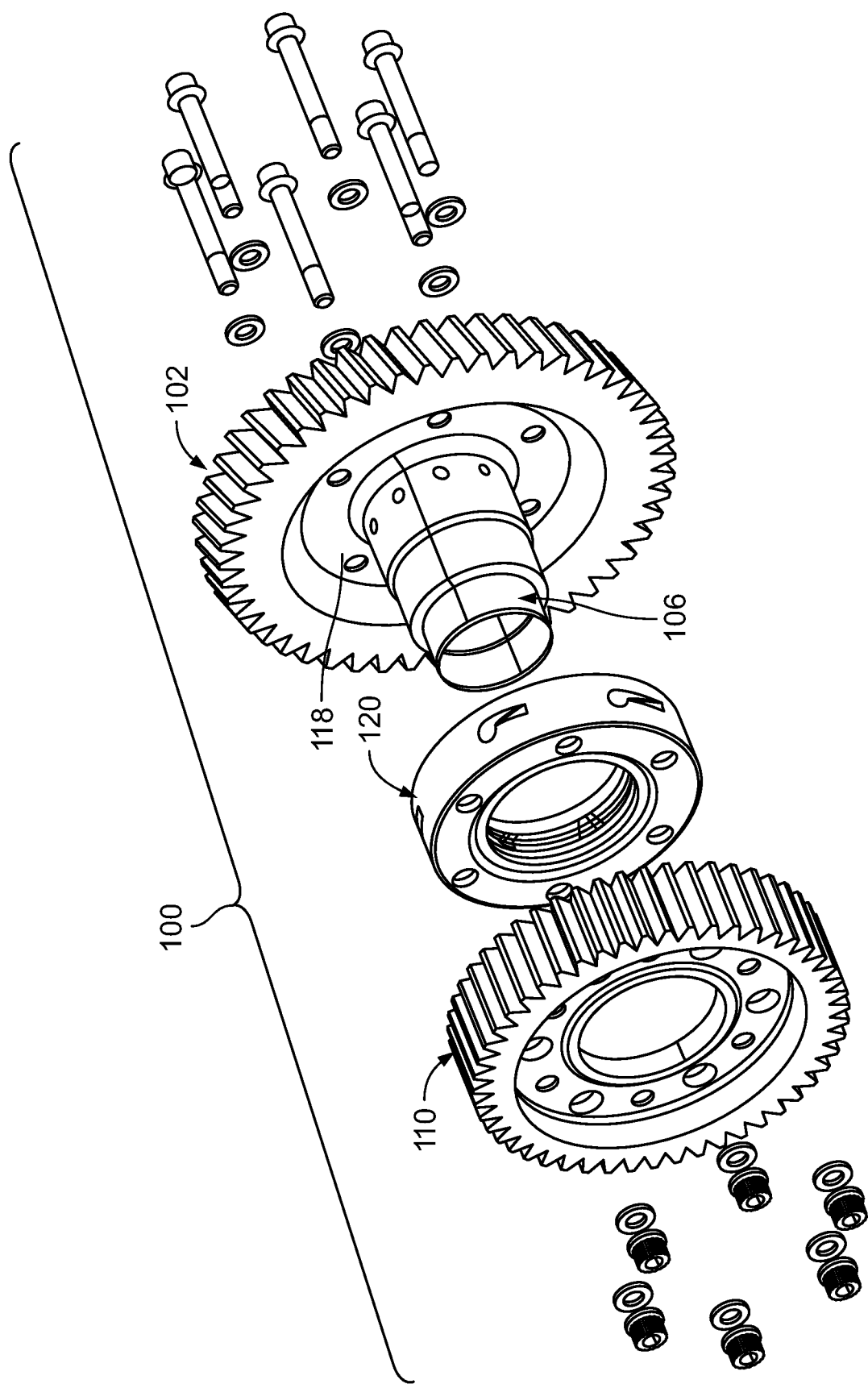
FIG. 3 illustrates a perspective exploded front view of the gearing system.
Figure 4:
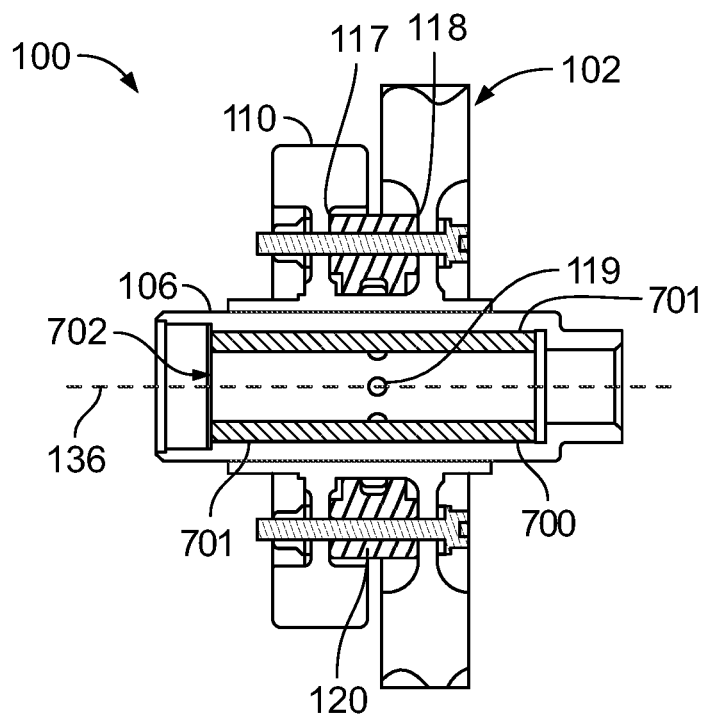
FIG. 4 illustrates an axial cross-sectional view of the gearing system through line 4-4 of FIG. 2.

FIG. 2 illustrates a top view of the gearing system 100. FIG. 3 illustrates a perspective exploded front view of the gearing system 100. FIG. 4 illustrates an axial cross-sectional view of the gearing system 100 through line 4-4 of FIG. 2. Referring to FIGS. 2-4, the gearing system 100 also includes a demister 120 that fits around a portion of the central shaft 106 of the first gear 102 and is sandwiched between a rear face 117 of the second gear 110 and a front face 118 of the first gear 102.

As shown in FIG. 4, in at least one embodiment, barrier filter 700 can be disposed within a central bore 702 of the central shaft 106. The barrier filter 700 can be an insert of mesh 701. The barrier filter 700 is configured to trap oil mist. The barrier filter 700 can be used with any of the embodiments of the present disclosure.

The barrier filter 700 can be a seamless tube of wound calendered wire, which is configured to filtration, noise suppression, and/or gas diffusion. For example, the barrier filter 700 can be a cylinder of mesh 701, which can be wound from stainless steel wire.

The barrier filter 700 can be used with any of the embodiments of the present disclosure. The barrier filter 700 provides a torturous path through which the oil passes. In effect, air is permitted to pass through the barrier filter 700, while oil is collected in the mesh 701. The barrier filter 700 may be sized for various pressure drops.

The barrier filter 700 helps to trap oil mist particles by providing ample surface area for the particles to attach and coalesce to larger droplets which are then more affected by centrifugal loading than airflow, and can be expelled by the centrifugal forces. The barrier filter 700 can be formed from a continuous wire thread that remains intact under the centrifugal loading as the shaft is rotating at high speed (in contrast to metal foam type filters which can crumble in vibratory environments and contaminate the oil system). Alternatively, various other types of filter media can be used. Optionally, embodiments of the present disclosure may not include the barrier filter 700.

Figure 5:
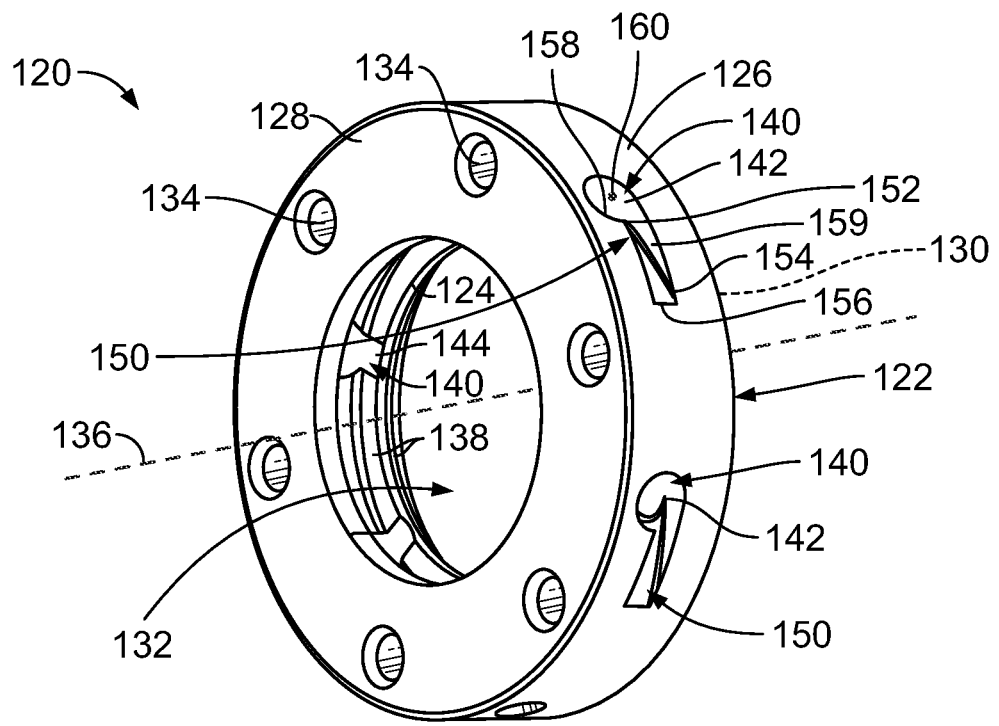
FIG. 5 illustrates a perspective front view of a demister, according to an embodiment of the present disclosure.

FIG. 5 illustrates a perspective front view of the demister 120, according to an embodiment of the present disclosure. The demister 120 may be integrally formed as a single piece of metal, such as steel, for example.

The demister 120 includes a main body 122, which may be formed as a disk-shaped plate. The main body 122 includes an inner annular rim 124 coupled to an outer annular rim 126 through a first or front wall 128 and a second or rear wall 130 that is opposite from the front wall 128. A central opening 132 is defined by the inner annular rim 124 and extends between and through the front wall 128 and the rear wall 130. Referring to FIGS. 1-5, the central shaft 106 of the first gear 102 extends through the central opening 132, such that the inner annular rim 124 fits around outer portions of the central shaft 106.

A plurality of fastener through-holes 134 extend through the main body 122 between and through the front wall 128 and the rear wall 130. The fastener through-holes 134 are generally parallel to a central longitudinal axis 136 and are configured to receive portions of the fasteners 116, so as to securely fasten the demister 120 to the first gear 102 and the second gear 110. The fastener through-holes 134 may be regularly spaced around the main body 122. The demister 120 may include more or less fastener through-holes 134 than shown.

A fluid channel 138 is formed into the inner annular rim 124 and may extend around a circumference of the inner annular rim 124. The fluid channel 138 extends into the inner annular rim 124 but does not extend entirely through the main body 122 to the outer annular rim 126.

A plurality of fluid passages 140 extend radially between and through the inner annular rim 124 the outer annular rim 126. Each fluid passage 140 includes a fluid inlet opening 142 in the outer annular rim 126 and a fluid outlet opening 144 (which is in fluid communication with the fluid inlet opening 142) formed in the inner annular rim 124. The fluid outlet openings 144 may fluidly couple to the fluid channel 138. In at least one embodiment, a diameter of at least one fluid passage 140 may be ¼". Optionally, the diameter of the fluid passages 140 may be greater or less than ¼".

The fluid inlet openings 142 are configured to accept incoming air, which may include oil mist particles. The fluid outlet openings 144 are configured to discharge filtered air that is devoid of oil mist particles, or otherwise includes a reduced amount of oil mist particles as compared to the incoming air. As described herein, the centrifugal forces exerted into the incoming air due to the rotation of the demister 120 causes the oil mist particles (such as have coalesced upon surfaces to form larger oil particles) to separate from the air, thereby allowing the filtered air to pass out of the fluid outlet openings 144.

The demister 120 also includes a fluid entrance channel 150 in fluid communication with at least one fluid inlet opening 142 formed in the outer annular rim 126. For example, each fluid passage 140 may be in fluid communication with a fluid entrance channel 150 formed into the outer annular rim 126. The fluid entrance channels 150 do not extend to the inner annular rim 124.

Each fluid entrance channel 150 extends along a portion of a circumference of outer annular rim 126. That is, each fluid entrance channel 150 is circumferentially formed into the outer annular rim 126. Each fluid entrance channel 150 includes a proximal end 152 that fluidly couples to a fluid inlet opening 142 and a distal end 154 that is distally away from a union of the fluid inlet opening 142 and the proximal end 152.

A first depth 156 of the fluid entrance channel 150 at the distal end 154 is less than a second depth 158 of the fluid entrance channel 150 at the proximal end 152. The first depth 156 may be the shallowest portion (that is, a shortest depth into the outer annular rim 126) of the fluid entrance channel 150, and the second depth 158 may be the deepest portion (that is, a longest depth into the outer annular rim 126) of the fluid entrance channel 150. In at least one embodiment, the depth of the fluid entrance channel increases at a constant rate from the distal end 154 to the proximal end 152. In at least one embodiment, the fluid entrance channel 150 is a radial segment having a central axis 159 that is offset from a central axis 160 of the fluid passage 140 to which the fluid entrance channel 150 connects. For example, the central axis 159 of the fluid entrance channel 150 is not coplanar with the central axis 160 of the fluid passage 140. Optionally, the fluid entrance channel 150 may not be offset from the central axis 160. As one example, a fluid entrance channel 150 may be formed by placing an end mill (such as a ⅛" end mill) onto a fluid inlet opening 142 and forming the second depth 158 between 0.10" and 0.50" and tangentially forming the remainder of the fluid entrance channel 150 to the distal end 154. Alternatively, the demister 120 may not include the fluid entrance channels 150.

Figure 6A:
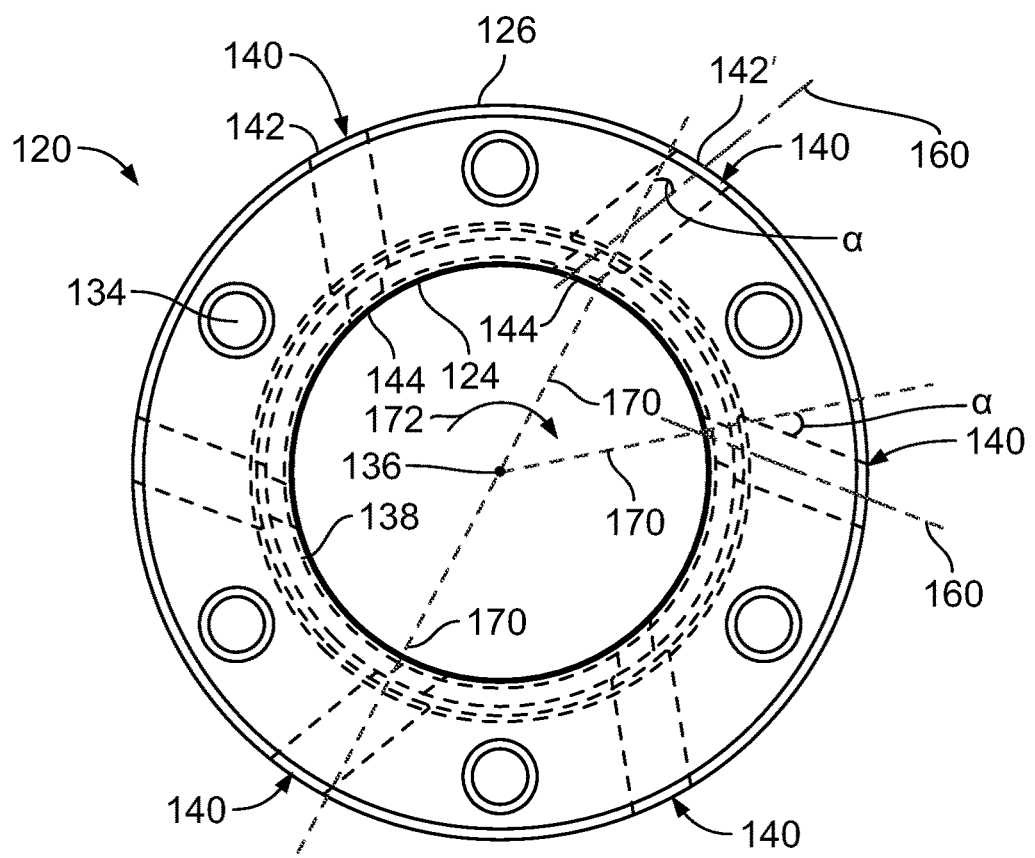
FIG. 6A illustrates a front view of the demister, according to an embodiment of the present disclosure.

FIG. 6A illustrates a front view of the demister 120. The fluid passages 140 are angled with respect to a radial line 170 extending from the central longitudinal axis 136. For example, the central axis 160 (extending between the fluid inlet opening 142 and the fluid outlet opening 144) of each fluid passage 140 is canted with respect to the radial line 170 at an angle α. The angle α is greater or less than 0 degrees. In at least one embodiment, the angle α is between 10 radial degrees and 45 radial degrees. In at least one embodiment, the fluid passages 140 are angled toward a direction of rotation 172. For example, the fluid inlet opening 142 of a fluid passage 140 is canted radially forward in the direction of rotation 172 from the fluid outlet opening 144. Optionally, the fluid passages 140 may be angled away from the direction of rotation. Alternatively, the fluid passages 140 may not be angled with respect to the radial lines 170.

As shown, the demister 120 includes six regularly spaced fluid passages 140. Optionally, the demister 120 may include more or less than six fluid passages 140.

Figure 6B:
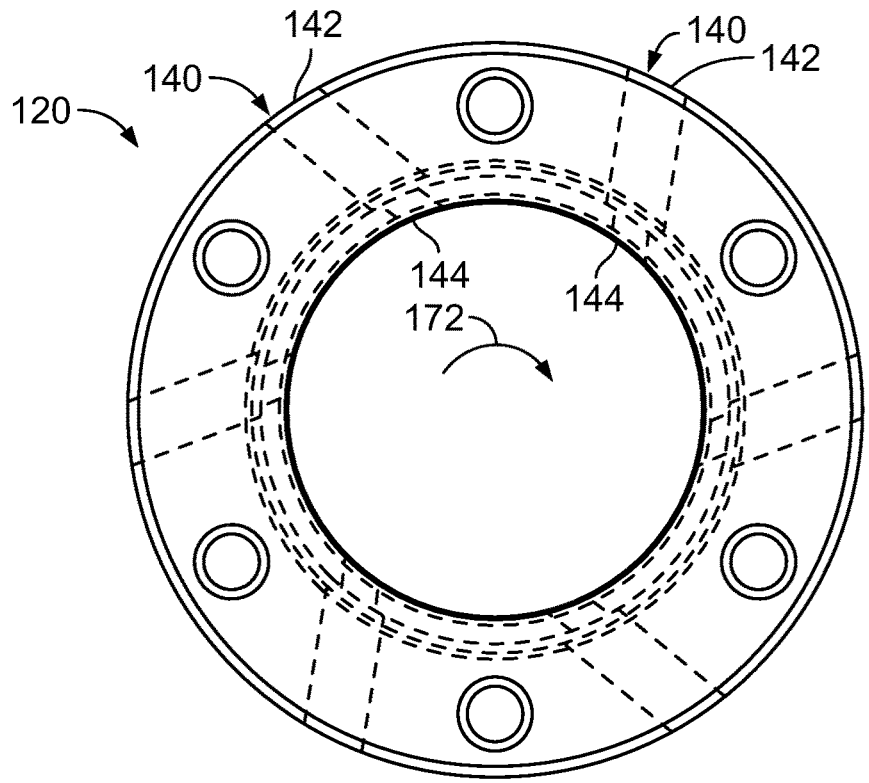
FIG. 6B illustrates a front view of the demister, according to an embodiment of the present disclosure.

FIG. 6B illustrates a front view of the demister 120, according to an embodiment of the present disclosure. The embodiment shown in FIG. 6B is similar to the embodiment shown in FIG. 6A, except that the fluid passages 140 are angled away from the direction of rotation 172. For example, as shown in FIG. 6B, the fluid inlet openings 142 of the fluid passages 140 are canted radially rearward from the direction of rotation 172 in relation to the fluid outlet openings 144.

Figure 7:
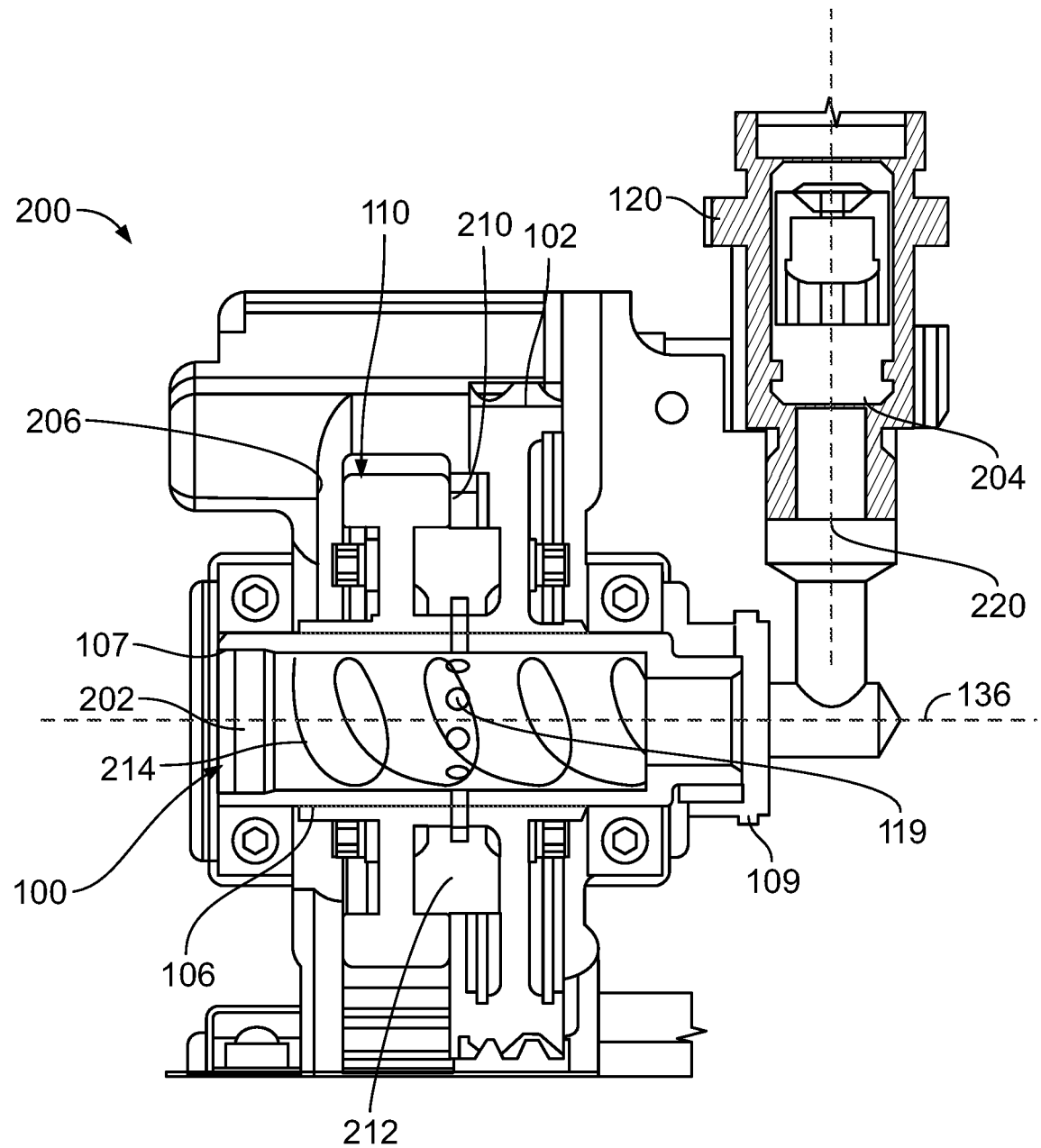
FIG. 7 illustrates an axial cross-sectional view of a gearing system within an auxiliary power unit (APU), according to an embodiment of the present disclosure.

FIG. 7 illustrates an axial cross-sectional view of the gearing system 100 within an APU 200, according to an embodiment of the present disclosure. A front end 107 of the central shaft 106 may be closed with a plug 202. A rear end 109 may be fluidly coupled to an air pressure regulating valve 204. In operation, secondary air from an engine flows into a gearbox 206. Referring to FIGS. 1-7, the oil particles may combine with the air and flow as combined fluid 210 into fluid entrance channels 150 of the demister 120 as the demister rotates along with the first gear 102 and the second gear 110. The rotation of the demister 120 exerts a centrifugal force into the combined fluid 210 which causes the oil mist particles 212 (which are heavier than air) to adhere within the demister 120 and remain within the gearbox 206, while air 214 separates therefrom, and passes out of the fluid outlet openings 144. The air 214 then passes into air passages 119 of the central shaft 106, into the air pressure regulating valve 204, and ultimately to exhaust.

In at least one embodiment, the demister 120 spins or otherwise rotates along with the first gear 102 and the second gear 110 at a high rate, such as 17,000 rpm. Such rotation centrifuges the oil mist particles back into the gearbox 206.

The demister 120 rotates about the central longitudinal axis 136, thereby creating centrifugal forces. In turn, the centrifugal forces separate the oil mist particles 212 from the air 214 to create filtered exhaust air 220, which passes out of the gearbox 206, while the oil mist particles 212 remain in the gearbox 206. The fluid passages 140, which extend radially through the main body 122, accept the combined fluid 210 at the fluid inlet openings 142 and pass filtered air 214 at the fluid outlet openings 144. In at least one embodiment, the fluid passages 140 are angled so as to control a desired pressure ratio between the inner annular rim 124 and the outer annular rim 126 of the demister 120. The fluid entrance channels 150 exert centrifugal forces into the incoming air, thereby causing the oil mist particles to separate from the air, such that the heavier oil mist particles are centrifugally forced away from the central channel 108 of the central shaft 106.

The fluid entrance channels 150 leading into the fluid passages 140 promote a swirling of the air-oil mixture as it flows into the demister 120. The swirling propels the heavier oil mist particles to the fluid outlet openings 144 where they coalesce with oil droplets and are effectively centrifuged outward, back into the gearbox 206. The fluid passages 140 are selectively angled to increase or decrease a pressure drop of the demister 120, as desired, to match pressure and flow requirements of the gearing system 100.

It has been found that the angled fluid passages 140 and the fluid entrance channels 150 increase centrifugal forces exerted into fluid including air and oil particles as the demister 120 rotates. The angled fluid passages 140 and the fluid entrance channels 150 increase separation of the oil mist particles from the air, thereby ensuring that the oil mist particles remain in the gearbox, instead of being exhausted. As such, the angled fluid passages 140 and the fluid entrance channels 150 ensure that the demister 120 effectively and efficiently removes oil from air, while also reducing backpressure and oil consumption rate. The demister 120 provides a centrifugal separator that operates on a fluid having air and oil mist particles, thereby separating the oil mist particles from the air, before the air is discharged from the gearbox 206.

Figure 8:
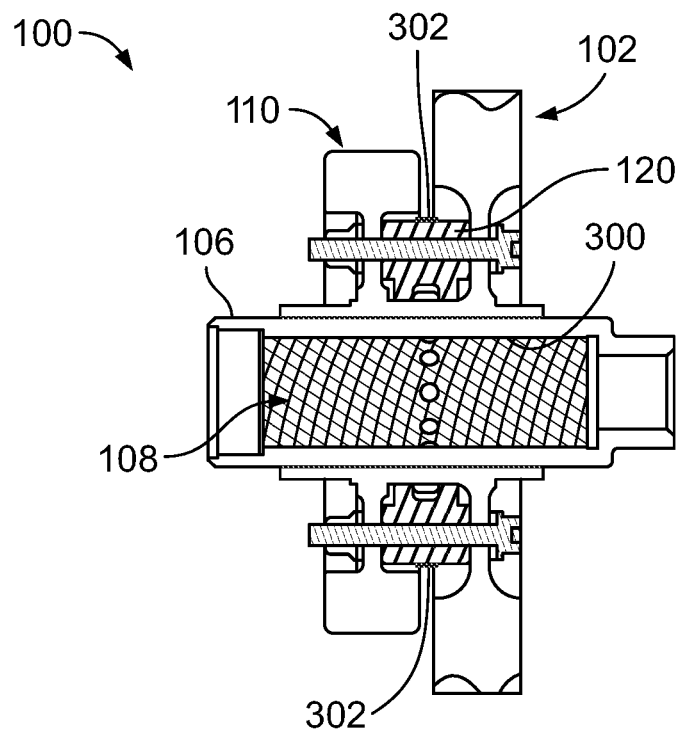
FIG. 8 illustrates an axial cross-sectional view of the gearing system, according to an embodiment of the present disclosure.

FIG. 8 illustrates an axial cross-sectional view of the gearing system 100, according to an embodiment of the present disclosure. In at least one embodiment, a tubular mesh insert 300 (such as formed of metal) may be disposed within the central channel 108 of the central shaft 106. The mesh insert 300 is an example of a barrier filter, as described with respect to FIG. 4. The mesh insert 300 may be a wire mesh rolled into a cylindrical shape. The mesh insert 300 provides increased surface area to contact fluid and therefore provide additional surface area to separate oil mist particles from the air. The mesh insert 300 may be used with any of the embodiments of the present disclosure. Optionally, the gearing system 100 may not include the mesh insert 300.

In at least one embodiment, the gearing system 100 may also include a stationary shroud 302 positioned around at least a portion of the rotating demister 120. The stationary shroud 302 provides a barrier that causes air flow to the demister 120 to slow, which thereby increases contact with (and angular acceleration when entering) the fluid entrance channels 150 of the demister 120 (shown in FIG. 5). As such, the shroud 302 may increase a rate of separation of the oil mist particles from air. The shroud 302 may be used with any of the embodiments of the present disclosure. Optionally, the gearing system 100 may not include the shroud 302.

Figure 9:
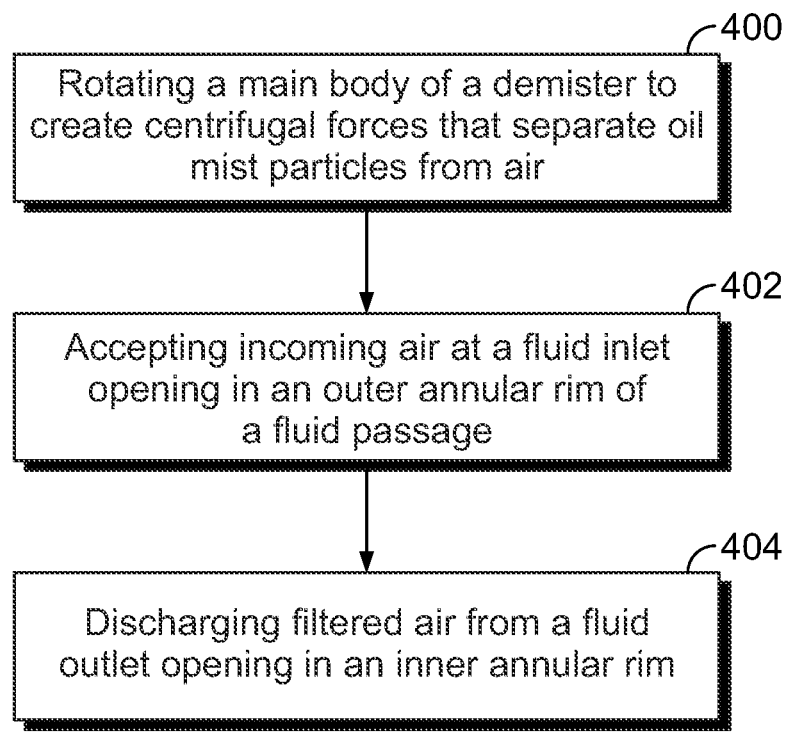
FIG. 9 illustrates a flow chart of a gearing method that is configured to separate oil mist particles from air, according to an embodiment of the present disclosure.

FIG. 9 illustrates a flow chart of a gearing method that is configured to separate oil mist particles from air, according to an embodiment of the present disclosure. The gearing method includes rotating (400) a main body shaped as a disk having an inner annular rim coupled to an outer annular rim through a first wall and a second wall opposite from the first wall about a central longitudinal axis. Said rotating (400) creates centrifugal forces that separate the oil mist particles from the air. The method also includes accepting (402) incoming air at a fluid inlet opening in an outer annular rim of at least one fluid passage that extends radially between and through the inner annular rim and the outer annular rim, and discharging (404) filtered air having a reduced amount of the oil mist particles from a fluid outlet opening in the inner annular rim.

In at least one embodiment, said accepting (402) includes accepting the incoming air from a fluid entrance channel in fluid communication with the fluid inlet opening in the outer annular rim. The gearing method may also include angling the at least one fluid passage fluid with respect to a radial line extending from the central longitudinal axis. Said angling may include angling the at least one fluid passage toward or away from a direction of rotation.

FIG. 10 illustrates a perspective front view of the demister 120, according to an embodiment of the present disclosure. The demister 120 may be integrally formed as a single piece of metal, such as steel, for example.

The demister 120 includes the main body 122, which may be formed as a disk-shaped plate. The main body 122 includes the inner annular rim 124 coupled to an outer annular rim 126 through the first or front wall 128 and the second or rear wall 130 that is opposite from the front wall 128. The central opening 132 is defined by the inner annular rim 124 and extends between and through the front wall 128 and the rear wall 130. Referring to FIGS. 1-4 and 10, the central shaft 106 of the first gear 102 extends through the central opening 132, such that the inner annular rim 124 fits around outer portions of the central shaft 106. The demister 120 is similar to the demister 120 shown in FIG. 5, with the following differences.

A plurality of fluid passages 540 extend radially between and through the inner annular rim 124 the outer annular rim 126. The fluid passages 540 are radial passages. Each fluid passage 540 includes a fluid inlet opening 542 in the outer annular rim 126 and a fluid outlet opening 544 (which is in fluid communication with the fluid inlet opening 542) formed in the inner annular rim 124. The fluid outlet openings 544 may fluidly couple to a fluid channel, such as the fluid channel 138 shown in FIG. 5. In at least one embodiment, a diameter of at least one fluid passage 540 may be ¼". Optionally, the diameter of the fluid passages 540 may be greater or less than ¼".

As shown, a series of three fluid passages 540 are regularly spaced about a circumference of the main body 122. For example, each group 541 of fluid passages 540 can include a central fluid passage 540a flanked by lateral fluid passages 540b. In at least one embodiment, the diameter of the central fluid passage 540a can be larger than the diameters of the lateral fluid passages 540b. The groups 541 may include more or less fluid passages 540 than shown. For example, the groups 541 may include two fluid passages 540. As another example, the groups 541 may include four or more fluid passages 540.

The fluid passages 540 do not connect with one another. Instead, each fluid passage 540 is separate and distinct from the other fluid passages 540. As shown, the fluid passages 540 have circular or substantially circular cross-sections. In at least one embodiment, the fluid passages 540 do not connect to a fluid entrance channel. Optionally, at least one of the fluid passages 540 can connect to a fluid entrance channel, as shown and described with respect to FIG. 5.

In at least one embodiment, the fluid passages 540 are disposed between axial fluid passages that extend between the front wall 128 and the rear wall 130, such as the through-holes 134. For example, each group 541 of fluid passages 540 is disposed between two bounding axial fluid passages, such as the axial through-holes 134. The through-holes 134 provide axial passages that are parallel to the longitudinal axis 136. In at least one embodiment, the fluid passages 540 do not connect to the through-holes 134. As such, a tortuous fluid path is formed in the demister 120.

The fluid inlet openings 542 are configured to accept incoming air, which may include oil mist particles. The fluid outlet openings 544 are configured to discharge filtered air that is devoid of oil mist particles, or otherwise includes a reduced amount of oil mist particles as compared to the incoming air. As described herein, the centrifugal forces exerted into the incoming air due to the rotation of the demister 120 causes the oil mist particles to separate from the air, thereby allowing the filtered air to pass out of the fluid outlet openings 544.

In at least one embodiment, the fluid passages 540 are not angled with respect to the radial line 170 extending from the central longitudinal axis 136 (as shown in FIG. 5). Instead, each fluid passages 540 is coaxial and aligned with a radial line. In this manner, the fluid passages 540 are sized, shaped, and oriented to not interfere with (that is, extend into) the axial through-holes 134. In at least one other embodiment, at least one of the fluid passages 540 can be angled with respect to the radial line 170. Such a fluid passage 540 may not interfere with the axial through-hole 134.

The demister 120 can include more or less axial through-holes 134 than shown. The through-holes 134 can provide axial fluid passages (in contrast to the radial fluid passages 540). At least one of the through-holes 134 may or may not be configured to receive a fastener.

The fluid passages 540 provide radial fluid paths. The fluid passages 540 can have different diameters from one another. The fluid passages 540 can have different diameters than shown. As noted, the demister 120 can have more or less fluid passages 540 than shown. By increasing the number of fluid passage 540 (such as by adding the lateral fluid passages 540b that flank the central fluid passage 540a), the surface area of the fluid reception area is increased, thereby increasing the area for ingress of the air-oil mixture.

FIG. 11 illustrates a perspective front view of the demister 120, according to an embodiment of the present disclosure. The demister 120 shown in FIG. 11 is similar to the demister 120 shown in FIG. 10, except that the fluid passages 540 are sized and shaped the same.

Figure 13:
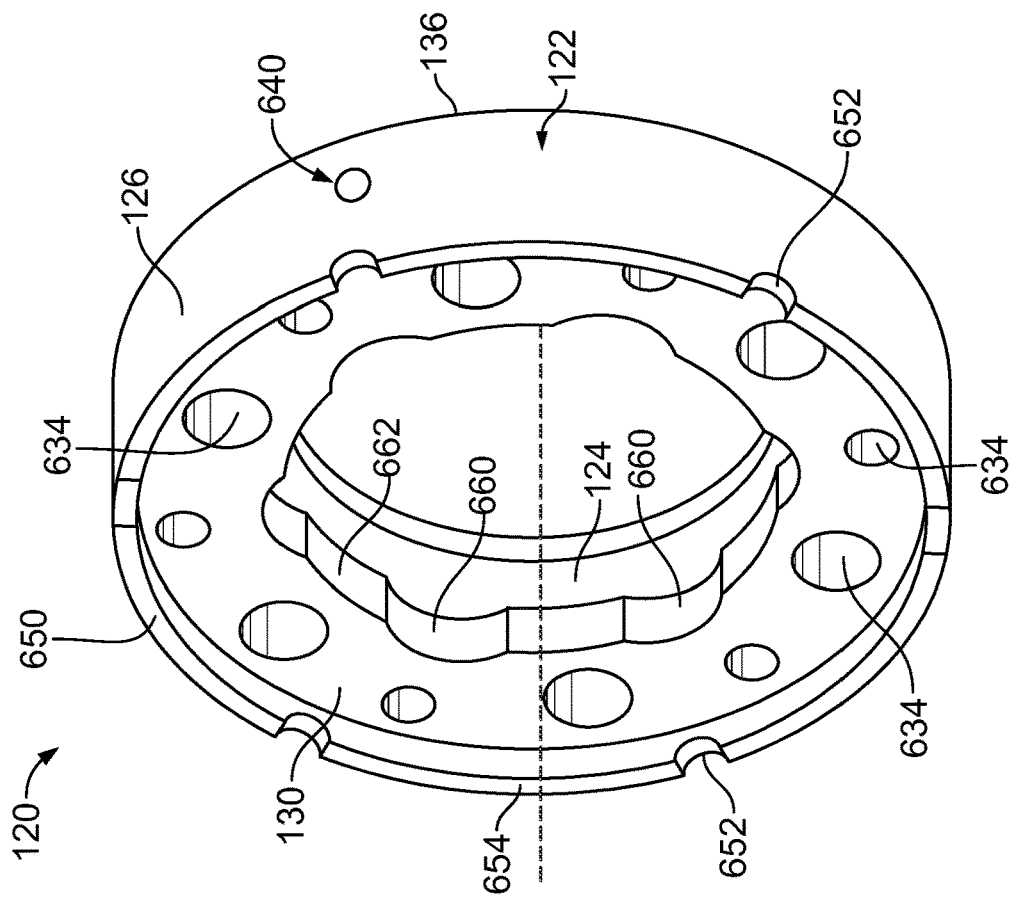
FIG. 13 illustrates a perspective rear view of the demister of FIG. 12.
Figure 12:
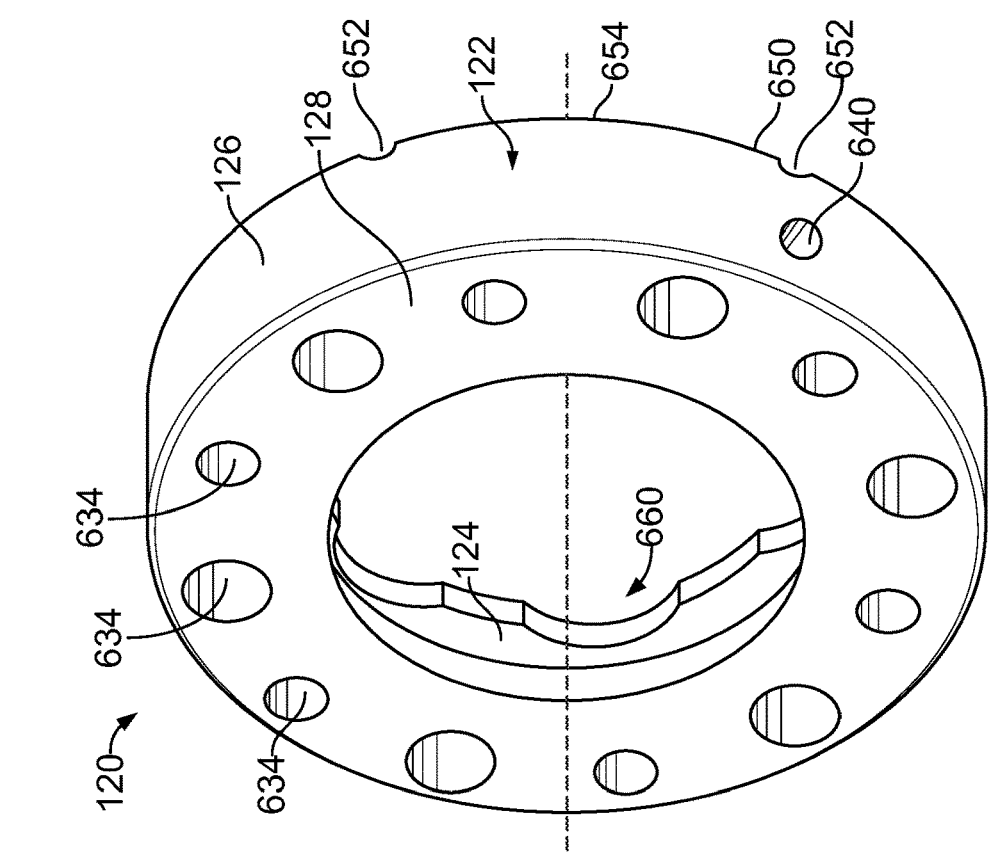
FIG. 12 illustrates a perspective front view of a demister, according to an embodiment of the present disclosure.

FIG. 12 illustrates a perspective front view of the demister 120, according to an embodiment of the present disclosure. FIG. 13 illustrates a perspective rear view of the demister 120 of FIG. 12. FIG. 14 illustrates a perspective view of the gearing system 100 having the demister 120 of FIGS. 12 and 13. Referring to FIGS. 12-14, in this embodiment, additional axial through-holes or fluid passages 634 are formed in the main body 122. The axial fluid passages 634 extend between and through the front wall 128 and the rear wall 130.

One or more of the fluid passages 634 can be axially aligned with (for example, parallel to) the central longitudinal axis 136. Optionally, one or more of the fluid passages 634 can be angled with respect to (for example, not parallel with) the central longitudinal axis 136.

As shown, less radial fluid passages 640 may be used. For example, the demister 120 can include two radial fluid passages 640, which are separated 180 degrees from one another about the main body 122. The smaller number of radial fluid passages 640 ensures that the radial fluid passages 640 do not interfere with the axial fluid passages 634, thereby ensuring a tortuous fluid path.

Additionally, a ridge 650 extends outwardly from the rear wall 130 (and/or optionally the front wall 128). For example, the ridge 650 is an extension of the outer annular rim 126. The ridge 650 extends outwardly from and around the rear wall 130 (and/or optionally the front wall 128).

One or more scallops 652 are formed in the ridge 650. For example, the scallops 652 are recesses, such as semi-circular indentations, that extend inwardly from an outer edge 654 of the ridge 650. The demister 120 can include more or less scallops 652 than shown. The scallops 652 can be used with any of the embodiments of the present disclosure.

In at least one embodiment, the demister 120 also includes radial recesses 660 formed into an interior edge 662 of the inner annular rim 124, such as at the junction with the rear wall 130. For example, the recesses 660 are indentations, such as semi-circular or arcuate divots. As a further example, the recesses 660 can be scallops that can be larger in size and shape than the scallops 652. Optionally, the recesses 660 can be sized and shaped similar to or the same as the scallops 652. The recesses 660 can be oriented orthogonally with respect to the scallops 652. Optionally, the demister 120 may not include the radial recesses 660.

The axial fluid passages 634, the radial fluid passages 640, the scallops 652, and the recesses 660 provide numerous entry paths for fluid, such as the air-oil mixture. Heavier oil particles are centrifuged outwardly and back into the gearbox 206 (shown in FIG. 7), as described herein.

FIG. 15 illustrates a perspective view of the demister 120, according to an embodiment of the present disclosure. In at least one embodiment, the outer annular rim 126 includes a conic wall segment 800 that slopes downwardly toward the front wall 128. The radial fluid passages 140 are formed in the conic wall segment 800. Fluid slots 802 can connect the fluid passages 140 to an outer edge 129 of the front wall 128. In this manner, the fluid slots 802 can provide scallops that directly connect to the radial fluid passages 140.

FIG. 16 illustrates a perspective view of a baffle 820, according to an embodiment of the present disclosure. The baffle 820 includes an annular rim 822 that is sized and shaped to fit around the conic wall segment 800 of the demister 120 of FIG. 15. The annular rim 822 includes a plurality of fluid openings 824 formed therethrough. A plurality of coupling flanges 826 extend outwardly from a front edge 828 of the annular rim 822. The coupling flanges 826 are configured to be securely connected to a gearbox.

FIG. 17 illustrates a perspective view of the baffle 820 coupled to the demister 120 of FIG. 15, according to an embodiment of the present disclosure. Referring to FIGS. 15-17, the baffle 820 is configured to draw fluid into the demister 120, such as via the fluid openings 824. The baffle 820 coupled to the demister 120, as shown, induces a swirling motion into the fluid, and additional centrifugal loading to cause the oil mist to adhere to surfaces defining the fluid passages 140 and fluid slots 802. It has been found that the configuration shown in FIG. 17 may also cause the oil mist to coalesce to larger size droplets, which can be more readily expelled.

As noted, the baffle 820 fits around the demister 120, and is fixed to the gearbox. As such, while the demister 120 is configured to rotate, as described herein, the baffle 820 is fixed and stationary. The baffle 820 directs airflow into the fluid slots 802, for example.

The fluid slots 802 leading into the radial fluid passages 140 promotes a swirling of the air-oil mixture as it flows into the demister 120. The swirling propels the heavier oil particles to the perimeters of the fluid passages 140, where the oil particles coalesce into droplet and are effectively centrifuged outward, back into the gearbox.

The demister 120 and the baffle 820 can be sized and shaped differently than shown in FIGS. 15-17. The baffle 820 can be sized and shaped for use with any of the demisters described herein.

Further, the disclosure comprises embodiments according to the following clauses:

Clause 1. A demister for a gearing system, the demister comprising:
a main body having an inner annular rim coupled to an outer annular rim through a first wall and a second wall opposite from the first wall, wherein the main body is configured to be rotated about a central longitudinal axis to create centrifugal forces that separate oil mist particles from air; and
first fluid passages extending radially between and through the inner annular rim and the outer annular rim, wherein the first fluid passages include a fluid inlet opening in the outer annular rim and a fluid outlet opening in the inner annular rim, wherein the fluid inlet opening is configured to accept incoming air, and wherein the fluid outlet opening is configured to discharge filtered air.

Clause 2. The demister of Clause 1, wherein a central opening is defined by the inner annular rim and extends between and through the first wall and the second wall.

Clause 3. The demister of Clauses 1 or 2, further comprising second fluid passages extending axially between and through the first wall and the second wall.

Clause 4. The demister of Clause 3, wherein the first fluid passages do not interfere with the second fluid passages.

Clause 5. The demister of any of Clauses 1-4, wherein the first fluid passages comprise groups of two or more first fluid passages.

Clause 6. The demister of Clause 5, wherein each of the groups is disposed between two second fluid passages that extend between and through the first wall and the second wall.

Clause 7. The demister of any of Clauses 1-6, wherein each of the first fluid passages is coaxial and aligned with a radial line.

Clause 8. The demister of any of Clauses 1-7, wherein a ridge extends from one of the first wall or the second wall, wherein one or more scallops are formed in the ridge.

Clause 9. The demister of any of Clauses 1-8, wherein the inner annular rim comprises one or more radial recesses formed into an interior edge.

Clause 10. The demister of any of Clauses 1-9, wherein the outer annular rim comprises a conic wall segment that slopes downwardly toward one of the first wall or the second wall.

Clause 11. The demister of Clause 10, wherein the outer annular rim comprises fluid slots that connect to the first fluid passages.

Clause 12. The demister of Clause 11, wherein the fluid slots further connect to an outer edge of the first wall or the second wall.

Clause 13. The demister of any of Clauses 1-12, wherein a baffle is configured to be disposed around at least a portion of the main body, wherein the baffle is further configured to be secured to a gearbox, and wherein the baffle comprises fluid openings.

Clause 14. A gearing system comprising:
a first gear having a central shaft defining a central channel;
a second gear; and
a demister coupled to the first gear and the second gear, wherein the demister comprises:
a main body having an inner annular rim coupled to an outer annular rim through a first wall and a second wall opposite from the first wall, wherein the main body is configured to be rotated about a central longitudinal axis to create centrifugal forces that separate oil mist particles from air;
first fluid passages extending radially between and through the inner annular rim and the outer annular rim, wherein the first fluid passages include a fluid inlet opening in the outer annular rim and a fluid outlet opening in the inner annular rim, wherein the fluid inlet opening is configured to accept incoming air, and wherein the fluid outlet opening is configured to discharge filtered air; and
second fluid passages extending axially between and through the first wall and the second wall.

Clause 15. The gearing system of Clause 14, wherein the first fluid passages do not interfere with the second fluid passages.

Clause 16. The gearing system of Clauses 14 or 15, wherein the first fluid passages comprise groups of two or more first fluid passages, wherein each of the groups is disposed between two second fluid passages that extend between and through the first wall and the second wall.

Clause 17. The gearing system of any of Clauses 14-16, wherein a ridge extends from one of the first wall or the second wall, wherein one or more scallops are formed in the ridge, and wherein the inner annular rim comprises one or more radial recesses formed into an interior edge.

Clause 18. The gearing system of any of Clauses 14-17, wherein the outer annular rim comprises fluid slots that connect to the first fluid passages, and wherein the fluid slots further connect to an outer edge of the first wall or the second wall.

Clause 19. The gearing system of any of Clauses 14-17, further comprising a baffle disposed around at least a portion of the main body, wherein the baffle is further configured to be secured to a gearbox, and wherein the baffle comprises fluid openings.

Clause 20. The gearing system of any of Clauses 14-19, further comprising a barrier filter disposed within the central channel.

As described herein, embodiments of the present disclosure provide a demister that that effectively and efficiently removes oil from air. Further, the demister reduces backpressure and oil consumption rate within a system, such as a gearbox of an APU.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A demister for a gearing system, the demister comprising:
a main body having an inner annular rim coupled to an outer annular rim through a first wall and a second wall opposite from the first wall, wherein the main body is configured to be rotated about a central longitudinal axis to create centrifugal forces that separate oil mist particles from air;
first fluid passages extending radially between and through the inner annular rim and the outer annular rim, wherein the first fluid passages include a fluid inlet opening in the outer annular rim and a fluid outlet opening in the inner annular rim, wherein the fluid inlet opening is configured to accept incoming air, and wherein the fluid outlet opening is configured to discharge filtered air; and
second fluid passages extending axially between and through the first wall and the second wall.

2. The demister of claim 1, wherein a central opening is defined by the inner annular rim and extends between and through the first wall and the second wall.

3. The demister of claim 1, wherein the first fluid passages do not interfere with the second fluid passages.

4. The demister of claim 1, wherein the first fluid passages comprise groups of two or more first fluid passages.

5. The demister of claim 4, wherein each of the groups is disposed between two of the second fluid passages.

6. The demister of claim 1, wherein each of the first fluid passages is coaxial and aligned with a radial line.

7. The demister of claim 1, wherein a ridge extends from one of the first wall or the second wall, wherein one or more scallops are formed in the ridge.

8. The demister of claim 1, wherein the inner annular rim comprises one or more radial recesses formed into an interior edge.

9. The demister of claim 1, wherein the outer annular rim comprises a conic wall segment that slopes downwardly toward one of the first wall or the second wall.

10. The demister of claim 9, wherein the outer annular rim comprises fluid slots that connect to the first fluid passages.

11. The demister of claim 10, wherein the fluid slots further connect to an outer edge of the first wall or the second wall.

12. The demister of claim 1, wherein a baffle is configured to be disposed around at least a portion of the main body, wherein the baffle is further configured to be secured to a gearbox, and wherein the baffle comprises fluid openings.

13. A gearing system comprising:
a first gear having a central shaft defining a central channel;
a second gear; and
a demister coupled to the first gear and the second gear, wherein the demister comprises:
a main body having an inner annular rim coupled to an outer annular rim through a first wall and a second wall opposite from the first wall, wherein the main body is configured to be rotated about a central longitudinal axis to create centrifugal forces that separate oil mist particles from air;
first fluid passages extending radially between and through the inner annular rim and the outer annular rim, wherein the first fluid passages include a fluid inlet opening in the outer annular rim and a fluid outlet opening in the inner annular rim, wherein the fluid inlet opening is configured to accept incoming air, and wherein the fluid outlet opening is configured to discharge filtered air; and
second fluid passages extending axially between and through the first wall and the second wall.

14. The gearing system of claim 13, wherein the first fluid passages do not interfere with the second fluid passages.

15. The gearing system of claim 13, wherein the first fluid passages comprise groups of two or more first fluid passages, and wherein each of the groups is disposed between two second fluid passages that extend between and through the first wall and the second wall.

16. The gearing system of claim 13, wherein a ridge extends from one of the first wall or the second wall, wherein one or more scallops are formed in the ridge, and wherein the inner annular rim comprises one or more radial recesses formed into an interior edge.

17. The gearing system of claim 13, wherein the outer annular rim comprises fluid slots that connect to the first fluid passages, and wherein the fluid slots further connect to an outer edge of the first wall or the second wall.

18. The gearing system of claim 13, further comprising a baffle disposed around at least a portion of the main body, wherein the baffle is further configured to be secured to a gearbox, and wherein the baffle comprises fluid openings.

19. The gearing system of claim 13, further comprising a barrier filter disposed within the central channel.

20. A demister for a gearing system, the demister comprising:
a main body having an inner annular rim coupled to an outer annular rim through a first wall and a second wall opposite from the first wall, wherein the main body is configured to be rotated about a central longitudinal axis to create centrifugal forces that separate oil mist particles from air; and
first fluid passages extending radially between and through the inner annular rim and the outer annular rim, wherein the first fluid passages include a fluid inlet opening in the outer annular rim and a fluid outlet opening in the inner annular rim, wherein the fluid inlet opening is configured to accept incoming air, wherein the fluid outlet opening is configured to discharge filtered air, wherein the first fluid passages comprise groups of two or more first fluid passages, and wherein each of the groups is disposed between two second fluid passages that extend between and through the first wall and the second wall.

21. A demister for a gearing system, the demister comprising:
a main body having an inner annular rim coupled to an outer annular rim through a first wall and a second wall opposite from the first wall, wherein a ridge extends from one of the first wall or the second wall, wherein one or more scallops are formed in the ridge, and wherein the main body is configured to be rotated about a central longitudinal axis to create centrifugal forces that separate oil mist particles from air; and
first fluid passages extending radially between and through the inner annular rim and the outer annular rim, wherein the first fluid passages include a fluid inlet opening in the outer annular rim and a fluid outlet opening in the inner annular rim, wherein the fluid inlet opening is configured to accept incoming air, and wherein the fluid outlet opening is configured to discharge filtered air.

22. A demister for a gearing system, the demister comprising:
a main body having an inner annular rim coupled to an outer annular rim through a first wall and a second wall opposite from the first wall, wherein the inner annular rim comprises one or more radial recesses formed into an interior edge, and wherein the main body is configured to be rotated about a central longitudinal axis to create centrifugal forces that separate oil mist particles from air; and
first fluid passages extending radially between and through the inner annular rim and the outer annular rim, wherein the first fluid passages include a fluid inlet opening in the outer annular rim and a fluid outlet opening in the inner annular rim, wherein the fluid inlet opening is configured to accept incoming air, and wherein the fluid outlet opening is configured to discharge filtered air.

23. A demister for a gearing system, the demister comprising:
a main body having an inner annular rim coupled to an outer annular rim through a first wall and a second wall opposite from the first wall, wherein the outer annular rim comprises a conic wall segment that slopes downwardly toward one of the first wall or the second wall, and wherein the main body is configured to be rotated about a central longitudinal axis to create centrifugal forces that separate oil mist particles from air; and
first fluid passages extending radially between and through the inner annular rim and the outer annular rim, wherein the first fluid passages include a fluid inlet opening in the outer annular rim and a fluid outlet opening in the inner annular rim, wherein the fluid inlet opening is configured to accept incoming air, and wherein the fluid outlet opening is configured to discharge filtered air.

24. A demister for a gearing system, the demister comprising:
a main body having an inner annular rim coupled to an outer annular rim through a first wall and a second wall opposite from the first wall, wherein the outer annular rim comprises fluid slots that connect to an outer edge of the first wall or the second wall, and wherein the main body is configured to be rotated about a central longitudinal axis to create centrifugal forces that separate oil mist particles from air; and
first fluid passages extending radially between and through the inner annular rim and the outer annular rim, wherein the fluid slots further connect to the first fluid passages, wherein the first fluid passages include a fluid inlet opening in the outer annular rim and a fluid outlet opening in the inner annular rim, wherein the fluid inlet opening is configured to accept incoming air, and wherein the fluid outlet opening is configured to discharge filtered air.

25. A demister for a gearing system, the demister comprising:

a main body having an inner annular rim coupled to an outer annular rim through a first wall and a second wall opposite from the first wall, wherein the main body is configured to be rotated about a central longitudinal axis to create centrifugal forces that separate oil mist particles from air; and first fluid passages extending radially between and through the inner annular rim and the outer annular rim, wherein the first fluid passages include a fluid inlet opening in the outer annular rim and a fluid outlet opening in the inner annular rim, wherein the fluid inlet opening is configured to accept incoming air, and wherein the fluid outlet opening is configured to discharge filtered air, wherein a baffle is configured to be disposed around at least a portion of the main body, wherein the baffle is further configured to be secured to a gearbox, and wherein the baffle comprises fluid openings.

\* \* \* \* \*